4 Sheets—Sheet 1.
R. RABY, Jr.
Animal-Trap.
No. 223,757. Patented Jan. 20, 1880.
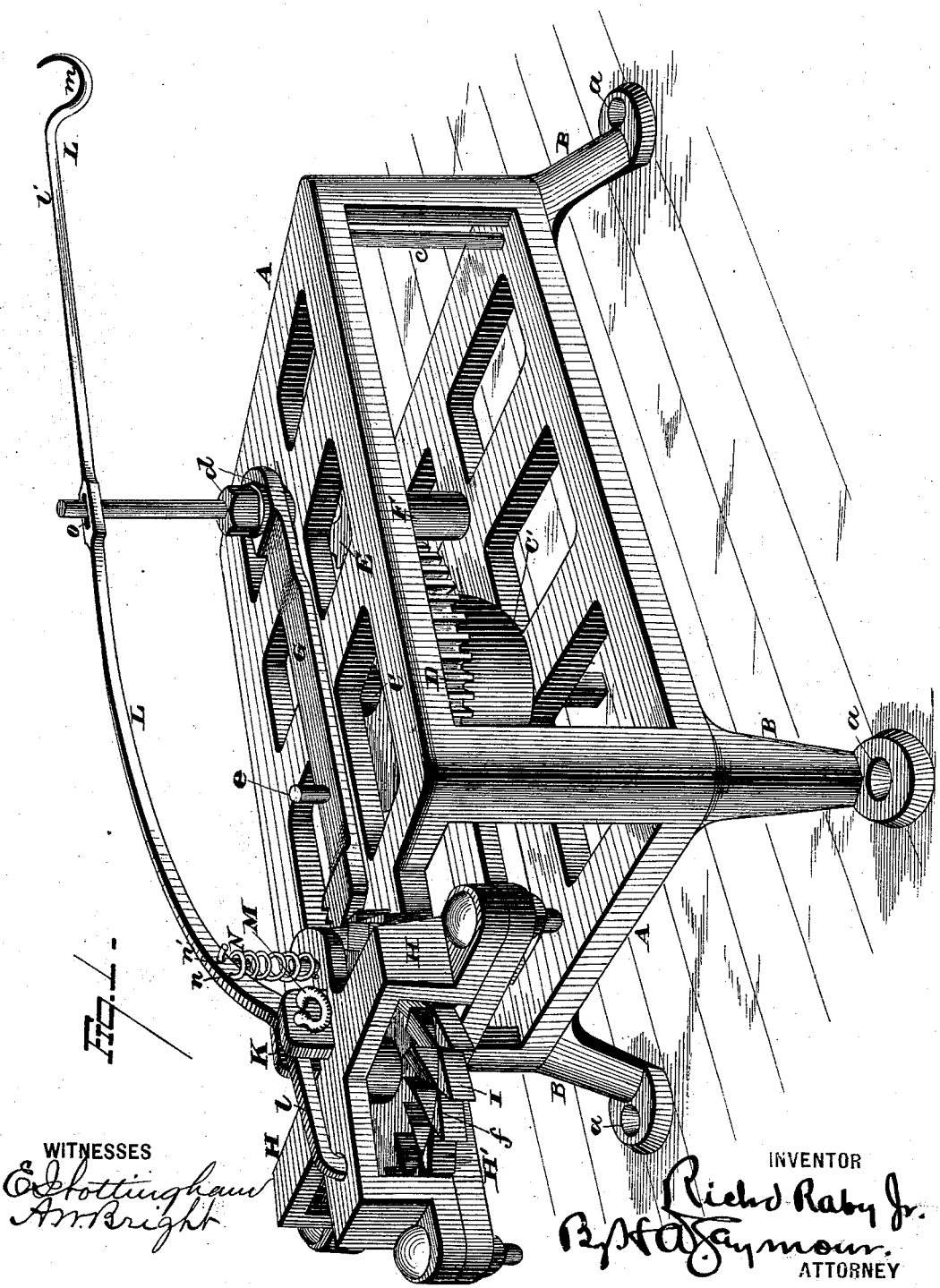
WITNESSES
INVENTOR
ATTORNEY

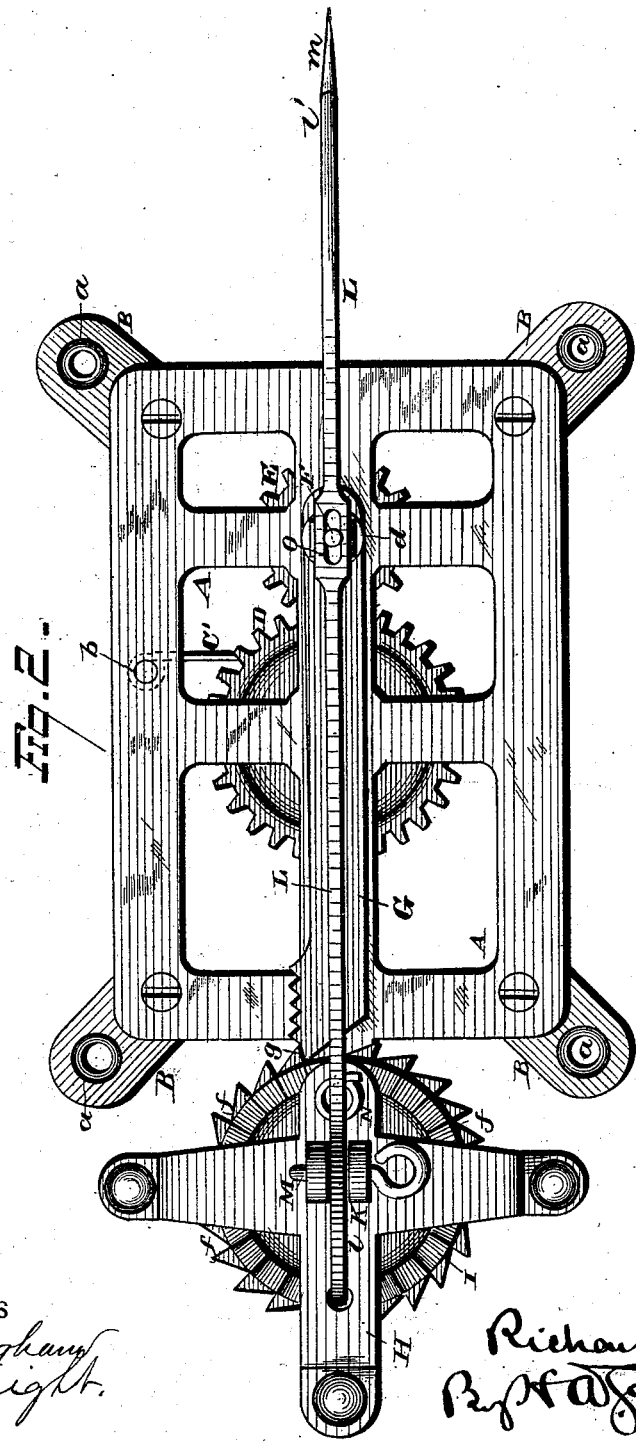

4 Sheets—Sheet 3.
R. RABY, Jr.
Animal-Trap.
No. 223,757. Patented Jan. 20, 1880.
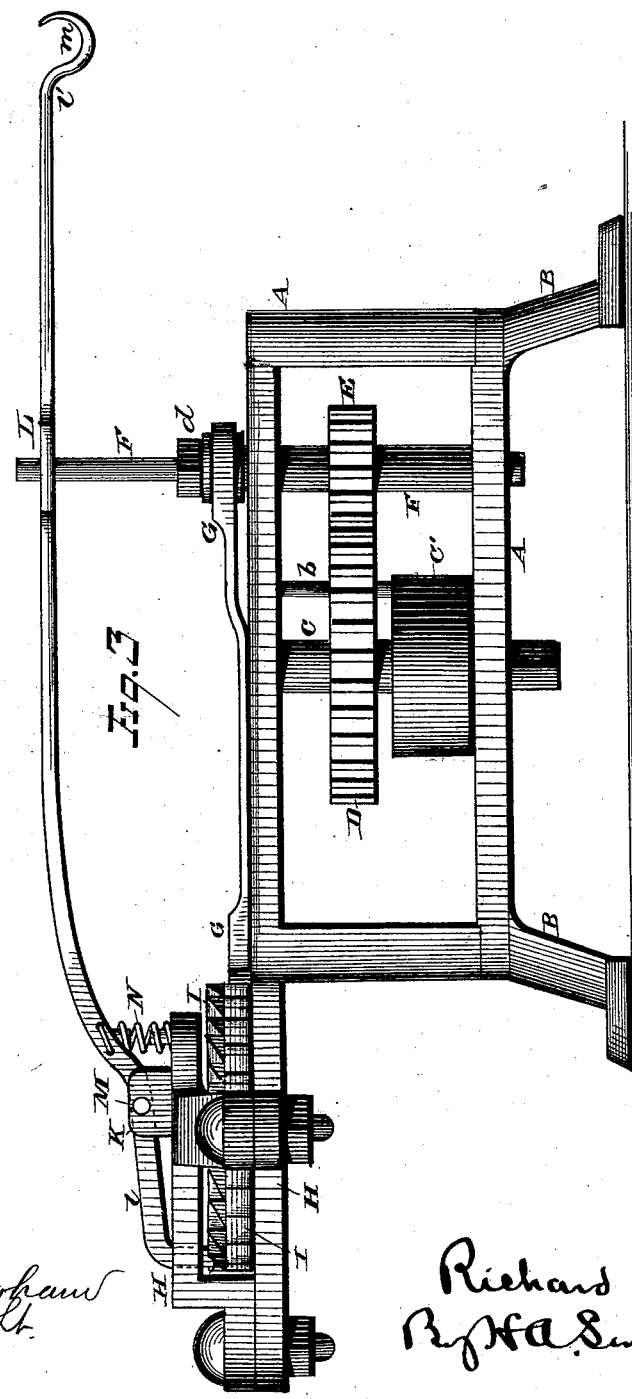

4 Sheets—Sheet 4.
R. RABY, Jr.
Animal-Trap.
No. 223,757. Patented Jan. 20, 1880.
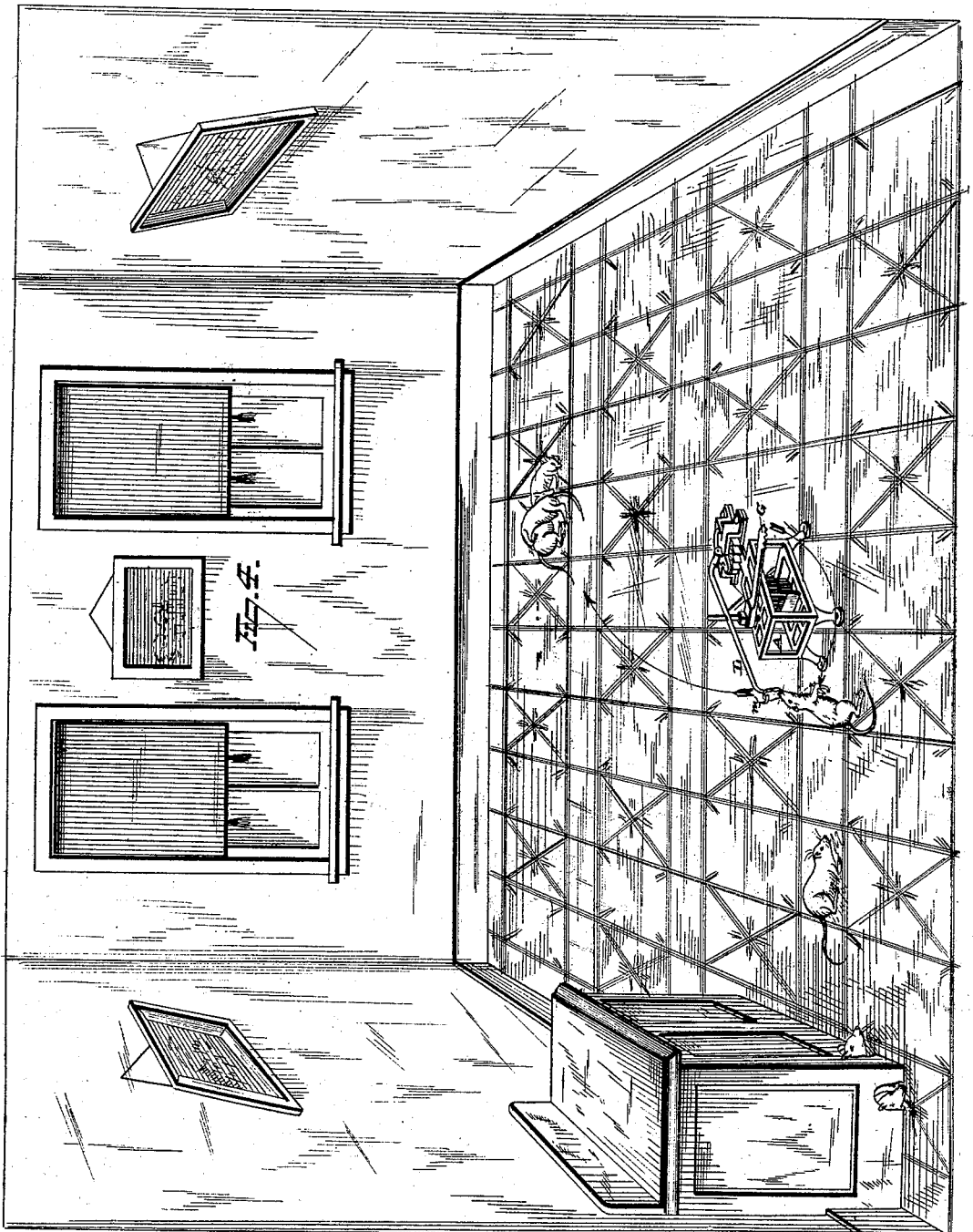
WITNESSES
E. Nottingham
A. M. Bright
INVENTOR
Richard Raby Jr.
By H. A. Seymour
ATTORNEY

UNITED STATES PATENT OFFICE.

RICHARD RABY, JR., OF YORK, PENNSYLVANIA, ASSIGNOR OF TWO-THIRDS OF HIS RIGHT TO CLAY ELI LEWIS AND JACOB HAY, OF SAME PLACE.

ANIMAL-TRAP.

SPECIFICATION forming part of Letters Patent No. 223,757, dated January 20, 1880.

Application filed November 28, 1879.

*To all whom it may concern:*

Be it known that I, RICHARD RABY, Jr., of York, in the county of York and State of Pennsylvania, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in self-setting animal-traps, the object being to provide a trap of simple and durable construction and of small first cost, and one capable of not only killing the animal, but also adapted to throw the victims a sufficient distance from the trap, so that they will not serve to frighten other animals from approaching the bait.

My invention consists, first, in the combination, with a spring-actuated arm adapted to be rotated in a horizontal plane, of a ratchet-wheel having ratchet-teeth on its periphery for the engagement of the outer end of the rotary arm, and provided with face ratchet-teeth and a vertically-yielding bait trigger or lever, the short arm of which engages with the teeth on the face of the ratchet.

My invention further consists in the several details in construction and combination of parts, as will hereinafter be described, and set forth in the claims.

In the accompanying drawings, Figure 1 is a view, in perspective, of my improved animal-trap. Fig. 2 is a plan view; Fig. 3, a side elevation of the same; and Fig. 4 shows the trap properly set and illustrates its operation.

A represents the frame of the trap, which is provided with legs or standards B, the latter perforated at *a*, whereby the trap may be firmly secured to the floor, if desired, though it is not necessary to secure the trap to a foundation, as it will be operative and effective if simply placed on the floor or ground. In the central portion of frame A is a center shaft, C, having one end of a coiled flat spring, C', rigidly secured thereto, the opposite end of the spring being secured to a post, *b*, or to one of the posts *c* of the frame. Center shaft, C, is provided with a pinion, D, which latter is rigidly secured thereto and meshes with a small pinion, E, attached to the counter-shaft F. To the upper end of counter-shaft F, which projects upwardly above the frame, is secured one end of an arm, G, by means of nuts *d*, or in any desired manner. The outer portion of arm G is provided with a handle, *e*, by means of which the arm may be rotated and the spring C' tightly coiled or wound around the center shaft, C. At the edge of arm G, on its outer end, are formed the teeth, of any desired number and size, for a purpose hereinafter described.

Within a suitable two-post bracket-support, H H', is journaled a ratchet-wheel, I, which is provided with ratchet-teeth *f* on its periphery and face ratchet-teeth on its upper side. The peripheral ratchet-teeth serve to retain the arm G in a state of rest against the force of the coiled spring when the trap is set, the spring having a tendency to forcibly and rapidly rotate said arm, and this is effected by forming a shoulder, *g*, on the extreme end of the arm, the latter being of such length that shoulder *g* will engage with one of the ratchet-teeth *f*.

The upper section, H, of the bracket-support is provided with the perforated lugs or standards K, between which is pivoted the bait-trigger L by means of the detachable pin M. The rear and short arm, *l*, of the bait-trigger is bent downward, and forms a vertically-adjustable bolt or dog that engages with the ratchet-teeth on the upper side or face of the ratchet-wheel. Upon the extreme end of the long arm *l'* of the bait-trigger is formed a hook, *m*, upon which the bait is secured.

N is an adjustable spring, the lower end of which rests upon the bracket-section H, while the upper end of the spring is inserted in holes *n n'* formed in the bait-trigger, and thereby serves to support the latter in a yielding manner.

By turning the spiral spring its tension may be readily adjusted, as desired. Bait-trigger L is formed with an elongated opening, O, which receives the upwardly-projecting end of the counter-shaft, the latter thereby serving as a guide to prevent any lateral displacement of the bait-trigger.

Having described the construction of the several parts of my improved animal-trap, I will now proceed to describe its operation.

To set the trap the arm G is rotated in opposition to the force of the coiled spring and the latter tightly wound up on its center shaft.

To wind up the coiled spring the bait-trigger may be removed from the trap, or its outer end may be depressed to disengage its rear end from the teeth of the face ratchet. After the spring has been wound the outer end of the bait-trigger is allowed to be raised by the force of the spiral spring, and its rear end to be depressed, which forces the bolt or dog on the rear and short arm of the bait-trigger in contact with one of the teeth on the face ratchet, thereby preventing the ratchet from rotating in one direction. The arm G is then allowed to rotate until the shoulder on its end strikes one of the ratchet-teeth on the periphery of the ratchet-wheel, when the arm is retained in a state of rest, and the trap is then properly set.

A rat in attempting to remove the bait from the hook on the end of the bait-trigger will depress the long arm of the trigger and raise the bolt or dog on the rear arm from engagement with the ratchet-tooth on the face of the ratchet-wheel, thus allowing the latter to rotate freely and release the arm G. The coil-spring imparts a quick and powerful movement to the arm, and as it rotates its outer toothed edge will strike the rat with sufficient force to not only kill him, but also to throw the body quite a distance from the trap, and the trap is then automatically reset by the action of the spiral spring, raising the long arm of the bait-trigger and depressing the short arm thereof, and again locking the ratchet-wheel and the outer end of the rotary arm therewith.

My improved rat-trap is of great destructive capacity, as a death-blow is imparted upon each rotation of the arm G, and the latter may be rotated a great number of times before the spring has unwound sufficient to have lost its power.

It is evident that slight changes may be made in the construction and arrangements of the several parts of my improvement without departing from the spirit of my invention—as, for instance, the tension of the spiral spring that raises the bait-trigger may be varied by means of a set-screw inserted through the bracket or trigger, and the end of the screw pressing against a cup within which rests one end of the spring, or the cup may be swiveled upon the end of the set-screw, as illustrated in Fig. 4. Again, the rotary arm may be made of cast-iron, and a lug cast solid therewith, to form a handle for winding up the spring. Other slight changes might be made, and hence I would have it understood that I do not limit myself to the exact construction shown and described; but, Having fully described my invention, what I claim as new, and desire to secure by Letters Patent, is—

1. A self-setting animal-trap consisting, essentially, in the combination, with a spring-actuated rotary arm and a pivoted bait-trigger, of a ratchet-wheel having ratchet-teeth for the engagement of the rotary arm and one end of the bait-trigger, substantially as set forth.

2. In a self-setting animal-trap, the combination, with a bait-trigger and a ratchet-wheel, one end of the bait-trigger engaging with the teeth on the ratchet-wheel, of a horizontally-rotating arm, the outer or free end of which engages with said ratchet-wheel, and a spring for rotating said arm, substantially as set forth.

3. In a self-setting animal-trap, the combination, with a horizontally-rotating arm having a row of teeth on its outer end, a spring for rotating said arm, and a ratchet-wheel, the outer or free end of the rotating arm engaging with teeth on the periphery of said ratchet-wheel, of a pivoted bait-trigger, one end of which engages with ratchet-teeth on the side of the ratchet-wheel, substantially as set forth.

4. The combination, with the frame of an animal-trap provided with a sectional bracket and a ratchet-wheel journaled between said sections, of a bait-trigger pivoted between lugs on the upper surface of the bracket, and an adjustable spiral spring for upholding the bait-trigger, substantially as set forth.

5. The combination, with the bait trigger or lever having two holes formed near its pivotal bearing, of a spiral spring, one end of which rests upon the bracket and the other end inserted through the holes in the bait trigger or lever, whereby the effective portion of said spring may be shortened or lengthened and the force of the spring increased or decreased, as desired, substantially as set forth.

In testimony that I claim the foregoing I have hereunto set my hand.

RICHARD RABY, JR.

Witnesses:
FRANK OSGOOD MCCLEARY,
A. W. BRIGHT.